United States Patent

[11] 3,628,562

[72] Inventor Johannis Bruins
 Barendrecht, Netherlands
[21] Appl. No. 865,115
[22] Filed Oct. 9, 1969
[45] Patented Dec. 21, 1971
[73] Assignee De Rotterdamsche Droogdok Maatschappij N.V.
[32] Priority Oct. 10, 1968
[33] Netherlands
[31] 68.14521

[54] CLOSING DEVICE WITH A STOP VALVE WHICH IS SITUATED OUTSIDE THE VALVE HOUSING
5 Claims, 3 Drawing Figs.

[52] U.S. Cl. .................................. 137/459, 137/460, 137/463
[51] Int. Cl. .................................. F16k 17/24
[50] Field of Search ........................ 137/458, 459, 460, 463

[56] References Cited
UNITED STATES PATENTS

| | | | |
|---|---|---|---|
| 1,283,061 | 10/1918 | Bridgham | 137/460 |
| 1,469,201 | 9/1923 | Whitted | 137/463 X |
| 3,429,321 | 2/1969 | Thrall | 137/458 X |

FOREIGN PATENTS

| | | | |
|---|---|---|---|
| 503,908 | 7/1930 | Germany | 137/459 |

*Primary Examiner*—Harold W. Weakley
*Attorney*—Fleit, Gipple and Jacobson

ABSTRACT: A closing device, particularly for use in vessels, comprising:
 a. a valve housing having a passage therethrough;
 b. a valve adapted to seal said passage through said valve housing;
 c. a valve rod passing through said valve housing, connected at one end to said valve, a portion of said valve rod adjacent its other end being threaded;
 d. a hand wheel connected to the upper end of said valve rod;
 e. a valve rod nut threadedly engaged with the threaded portion of said valve rod;
 f. a first spring biasing said valve rod not towards said hand wheel;
 g. means mounted around said valve and including a flexible part composed of a plurality of claws having an outer surface tapered axially toward said hand wheel, and a rigid part;
 h. a second spring biasing said means in an axial direction toward the said hand wheel;
 i. a portion of the inner surface of the said valve housing having a frustoconical shape cooperating with the tapered outer surface of said claws adapted to clamp the said valve rod nut in a set position; and
 j. said valve housing and said rigid part defining therebetween a chamber adapted to be connected to a pressure source to move said rigid part against said second spring and unclamp said flexible part from said valve rod nut.

INVENTOR
JOHANNIS BRUINS

INVENTOR
JOHANNIS BRUINS

CLOSING DEVICE WITH A STOP VALVE WHICH IS SITUATED OUTSIDE THE VALVE HOUSING

The invention relates to a closing device, more specifically designed for vessels, with a stop valve which is situated outside the valve housing and is connected to a hand wheel, provided at the other side of the housing, by means of a valve rod which has at least partially been provided with screw thread.

Where such conventional devices are concerned, the screw thread of the valve rod engages a corresponding screw thread of the valve housing, which makes it possible for the stop valve to be opened and closed again. If breaking should occur in the discharge line of such a closing device, for instance in the suction line of a pump, the medium passing through, water for instance, will flow out of the line until the closing device is closed, this requires constant watching and may lead to considerable losses.

It is the object of the invention to furnish a closing device which does away with said disadvantage and is closed automatically when such breaking occurs.

To achieve this purpose according to the invention a valve rod nut which is spring loaded is mounted on the screw thread of the valve rod, while a flexible or resilient element, connected with a rigid part and spring loaded in axial direction towards the hand wheel is provided, said element being for instance a flexible sleeve or a number of flexible claws, with an outer surface tapering towards the hand wheel, said outer surface when in open position clamps the valve rod nut by cooperating with a frustoconical internal surface of the housing, an enclosure being present in this position between a surface of the rigid part directed towards the hand wheel and a surface of the housing, said enclosure being adapted to be connected to a pressure source via a passage.

Such a closing device would be closed, and this in contrast to the conventional closing device, when a sudden increase in pressure in front of the valve should occur, for example, where vessels are concerned, particularly naval vessels, due to a depth bom, because the valve rod nut is moved towards the closed position by the great pressure on the valve, notwithstanding the clamping action of the resilient element, which is undesired.

In order to prevent this, the closing device has preferably been constructed in such a way that the diameter of the outside surface of the valve rod nut cooperating with the flexible element tapers off in the direction of the hand wheel.

In order to be able to move the closing device back to the open position after it has automatically closed, claws have been provided according to the invention, which claws are pivotally around pivots of the valve housing, the ends of said claws are forced towards the valve rod by springs, and this in such a way that said claws in the open position of the valve are coming to rest against faces connected with the hand wheel, whereas in the closed position of the valve they come to rest against faces connected with the valve rod nut, while when the valve is closed by rotating the hand wheel in the one direction in which the valve rod nut moves away from the hand wheel, the claws come to rest on a shoulder in such a way that the valve rod nut is prevented from moving towards the hand wheel, while by turning the hand wheel in the other direction in order to open the valve the claws again come to rest against the faces connected with the hand wheel.

The invention relates also to a closing system with a closing device as described above in which two gauges for measuring the pressure have been provided in the discharge line of the closing device at a mutual distance from each other, impulses being transmitted via pipes from said gauges to a regulator in such a way that via a pipeline pressure medium is passed through the passage towards the space in the closing device as soon as a predetermined difference in pressure is exceeded.

This closing system may be constructed in such a way according to the invention that when the regulator starts operating when the predetermined difference in pressure is exceeded, the upstream connecting pipe between the regulator and the discharge pipe is connected with the connecting pipe between the regulator and the passage in the valve housing.

The invention is more fully explained with reference to the drawing.

Figure 1:
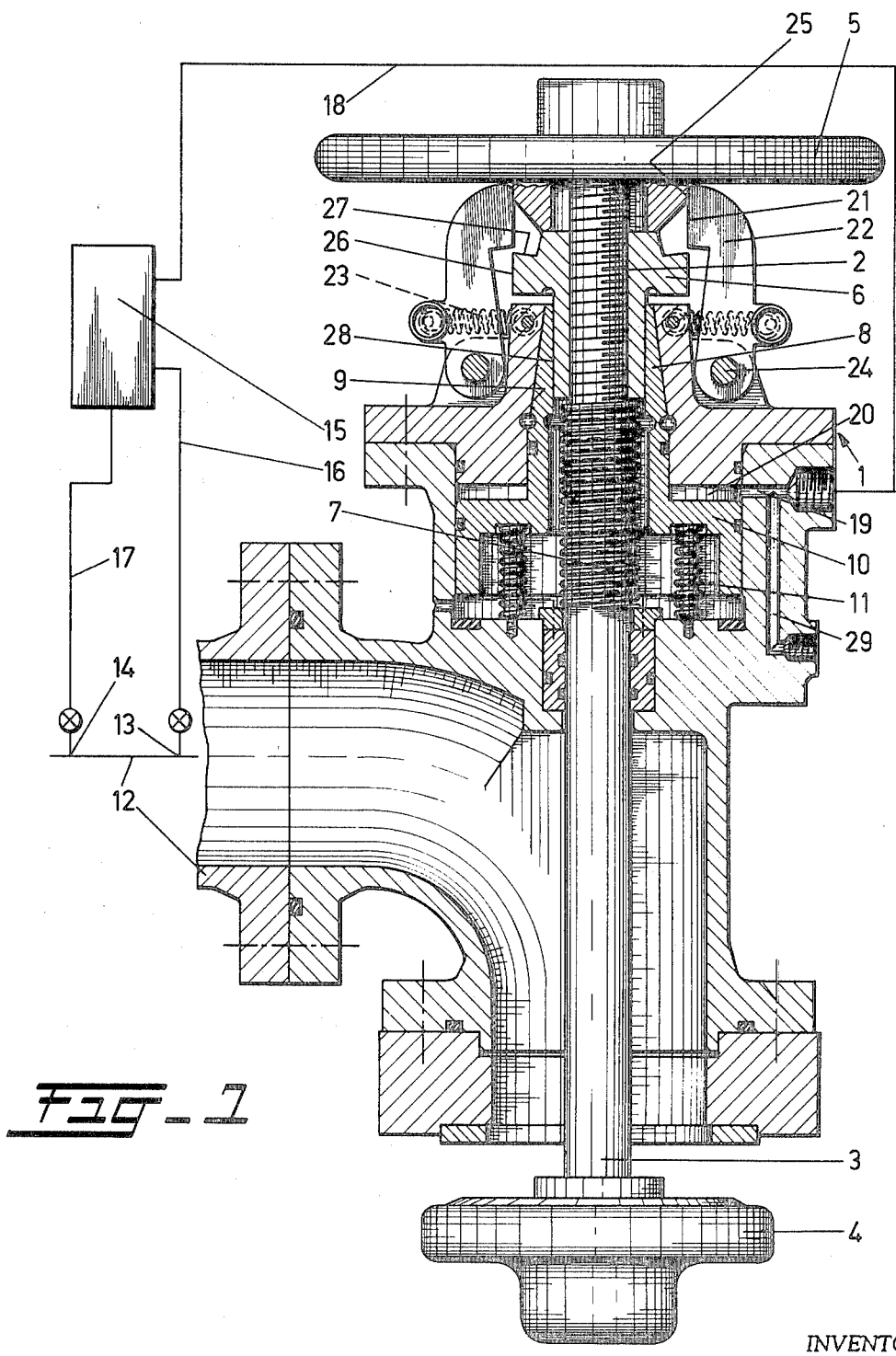
FIG. 1 shows a closing device according to the invention when the valve is in open position.

The closing device comprises a valve housing 1 with a valve 4 and a handwheel 5, situated outside the housing 1 and connected by means of a valve rod 3 partially provided with screw thread 2. On the screw thread 2 of the valve rod 3 a valve rod nut 6 has been provided which is under the influence of a spring 7 which tries to move the valve rod nut 6 towards the hand wheel 5. In closed condition, see FIG. 1, there is a flexible element 8 between the valve rod nut 6 and the housing 1, said element 8 may be, for example, a flexible sleeve or a number of flexible claws, the outside surface of which is of conical design in order to cooperate with a frustoconical inner surface 9 of the housing 1.

The flexible or resilient element 8 is connected with a rigid part 10 which at the bottom is loaded by springs 11, said springs endeavoring to move this part 10, and with it the element 8, towards the hand wheel 5, so that in the open position according to FIG. 1 the element 8 via the part 10 is forced by the springs 11 in upward direction against the conical inner surface 9 and the rod valve nut 6 causing the rod valve nut 6 to be retained by the element 8 and the valve 4 to remain open, notwithstanding the fact that the pressure force exerted by the medium is greater on the lower side of the valve 4 than on the upper side.

When the closing device is in the open position, the medium in front of the valve 4, that is outside the valve housing, is connected with, for example, suction side of a pump not shown in the drawing via a pipeline 12.

In the circuit of the medium through the closing device and the pipeline 12 the pressure is gauged at two places, situated at a suitable distance from each other in this circuit, for example, the points 13 and 14, the difference in pressure activating a diagrammatically shown regulator 15 via impulse lines 16 and 17 respectively.

This regulator 15 is adjusted in such a way that on exceeding a predetermined difference in pressure occurring when there is a breaking in the suction pipe, the regulator 15 comes in action in order to pass pressure medium via pipeline 18 and a passage 19 into the housing 1 in the enclosure 20 between the housing 1 and the rigid part 10, the pressure of this fluid moving the rigid part 10 and with it the spring-loaded element 9 away from the hand wheel right against the action of the springs 11. This causes the clamping action of the element 8 on the valve rod nut 6 to be released, and the valve 4 with the valve rod 3, the hand wheel 5 and the valve rod nut 6 to be moved in the closed position by the difference in pressure on the lower and upper side of the valve 4, see FIG. 2. The spring 7 now being released.

During this closing action the faces 21 of the claws 22 are forced by springs 23, which have been secured to the housing 1 on the one hand and to the claws 22 on the other, in the direction of the valve rod 3 by rotation around shafts 24 situated in the housing 1 to come to rest against faces 26 of the valve rod nut 6 instead of faces 25 of the hand wheel 5.

Figure 2:
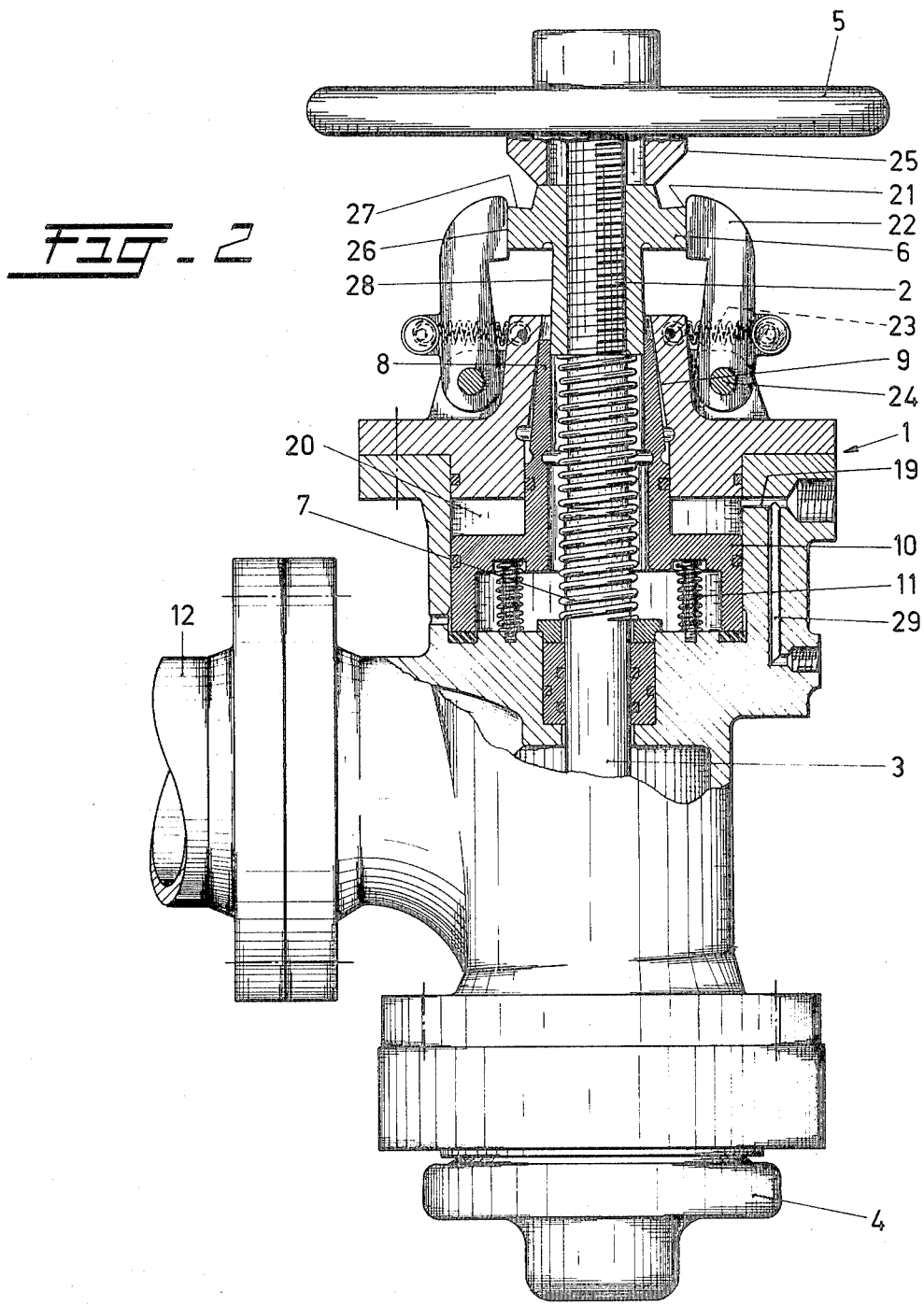
FIG. 2 shows the closing device when the valve is in closed position.
Figure 3:
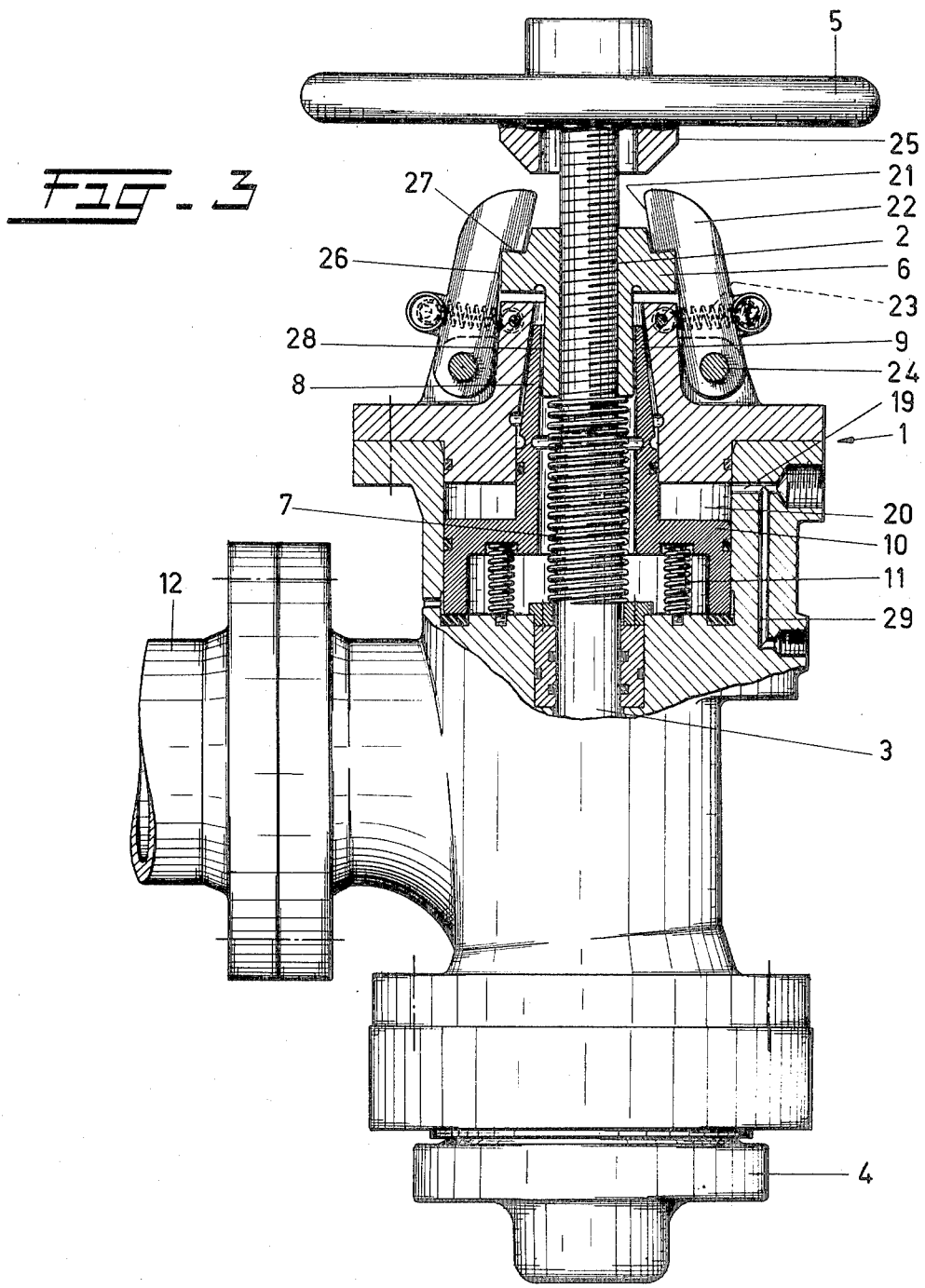
FIG. 3 shows the closing device in closed position, the valve rod nut being turned inwards.

The claws 22 are required to return the valve 4 from the closed position in FIG. 2 to the open position according to FIG. 1. For this purpose the hand wheel 5 is firstly turned in that direction in which the valve 4 maintains its closed position. The rod valve nut 6 which is prevented from turning by the claws 22 is moved away from the hand wheel 5 until the claws 26 do not rest any longer on the face 26 but come to rest on the shoulder 27 of the rod valve nut 6 by means of the springs 23, see FIG. 3. During this movement the spring 7 is compressed.

The hand wheel 5 is then turned in the opposite direction causing the valve 4 to be opened, while the valve rod nut 6 is prevented from moving upwards by the claws 22, while at the same time the pressure in the enclosure 20 is neutralized by opening in closing device not shown in the drawing, for example, via the passage 29 in the housing 1. Because of this the rigid part 10 and with it the element 9 is moved in the direction of the hand wheel by the springs 11 again taking the locked position according to FIG. 1, the closing device then being closed again. The valve 4 may then be automatically closed again by the regulator 15.

As in the embodiment described above the valve rod 3 is not connected to the housing 1 by screw thread, this in contrast with the conventional closing devices, the valve 4 would shut at any rate when a sudden increase in pressure would occur in front of the valve 4, for example, by a depth bom where a vessel is concerned, notwithstanding the clamping pressure of the element 8.

To prevent this, the outside surface 28 of the rod clamping nut 6 is not cylindrical, but slightly conical of design, the diameter of the surface 28 being smaller at the side of the hand wheel than at the other side. Because of this the valve rod nut 6, and with it the valve 4, is held more firmly in the open position by the element 8, resting itself against the inclined inner surface, when a sudden increase in pressure occurs in front of the valve 4.

It is observed that provisions may be provided for closing the valve 4 electrically, pneumatically, or in any other way by remote control, which may also be effected via the regulator 15.

It is also observed that the pressure of the medium flowing through the closing device may be used to close the valve 4 by connecting the pipeline 16 with the pipeline 18 in the regulator 15 via the pipes 16 and 17, for example, by means of the difference in pressure between the points 13 and 14.

I claim:

1. A closing device, particularly for use in vessels, comprising:
   a. a valve housing having a passage therethrough;
   b. a valve adapted to seal said passage through said valve housing;
   c. a valve rod passing through said valve housing, connected at one end to said valve, a portion of said valve rod adjacent its other end being threaded;
   d. a hand wheel connected to the upper end of said valve rod;
   e. a valve rod nut threadedly engaged with the threaded portion of said valve rod;
   f. a first spring biasing said valve rod nut towards said hand wheel;
   g. means mounted around said valve rod and including a flexible part composed of a plurality of claws having an outer surface tapered axially toward said hand wheel, and a rigid part;
   h. a second spring biasing said means in an axial direction toward the said hand wheel;
   i. a portion of the inner surface of the said valve housing having a frustoconical shape cooperating with the tapered outer surface of said claws adapted to clamp the said valve rod nut in a set position; and
   j. said valve housing and said rigid part defining therebetween a chamber adapted to be connected to a pressure source to move said rigid part against said second spring and unclamp said flexible part from said valve rod nut.

2. A closing device according to claim 1 wherein the outer surface of said valve rod nut tapers off towards the hand wheel.

3. A closing device according to claim 1 further comprising rotatable claws pivotally mounted on said valve housing and biased by a spring towards said valve rod such that in the open position of the valve said claws abut faces on the said hand wheel, in the automatically closed position of the valve said claws abut faces on the said valve rod nut, an in the closed and locked position of the valve said claws abut shoulders on the said valve rod nut constraining same from moving in an axial direction toward said hand wheel, said valve rod nut being released and said valve being opened by rotation of said hand wheel in an opening direction whereby said claws again come to rest against the said faces on the hand wheel.

4. A closing device according to claim 1 further comprising means to sense the pressure in the circuit, at spaced locations, a regulator and means for transmitting pressures sensed to said regulator so that upon exceeding a predetermined sensed difference in pressure a pressure medium is passed into said chamber to unclamp said valve rod nut.

5. A closing device according to claim 4, wherein said regulator connects said chamber in the valve housing to the upstream pressure sensing means when the sensed difference in pressure exceeds the predetermined value.

* * * * *